United States Patent
Yannam et al.

(10) Patent No.: US 12,260,855 B2
(45) Date of Patent: Mar. 25, 2025

(54) SEMANTIC FRAME BUILDER

(71) Applicant: Bank of America Corporation, Charlotte, NC (US)

(72) Inventors: Ramakrishna R. Yannam, The Colony, TX (US); Emad Noorizadeh, Plano, TX (US); Rajan Jhaveri, Plano, TX (US); Jennifer Russell, Dallas, TX (US)

(73) Assignee: Bank of America Corporation, Charlotte, NC (US)

( * ) Notice: Subject to any disclaimer, the term of this patent is extended or adjusted under 35 U.S.C. 154(b) by 383 days.

(21) Appl. No.: 17/993,029

(22) Filed: Nov. 23, 2022

(65) Prior Publication Data

US 2024/0169978 A1 May 23, 2024

(51) Int. Cl.
| | |
|---|---|
| G06F 40/30 | (2020.01) |
| G10L 15/18 | (2013.01) |
| G10L 15/183 | (2013.01) |
| G10L 15/22 | (2006.01) |
| G06F 40/279 | (2020.01) |
| G06F 40/284 | (2020.01) |
| G06F 40/289 | (2020.01) |
| G10L 15/16 | (2006.01) |

(52) U.S. Cl.
CPC .......... *G10L 15/1815* (2013.01); *G06F 40/30* (2020.01); *G10L 15/1822* (2013.01); *G10L 15/183* (2013.01); *G10L 15/22* (2013.01); *G06F 40/279* (2020.01); *G06F 40/284* (2020.01); *G06F 40/289* (2020.01); *G10L 15/16* (2013.01); *G10L 15/18* (2013.01); *G10L 2015/223* (2013.01); *G10L 2015/228* (2013.01)

(58) Field of Classification Search
None
See application file for complete search history.

(56) References Cited

U.S. PATENT DOCUMENTS

| | | | |
|---|---|---|---|
| 8,700,404 B1 * | 4/2014 | Chotimongkol | G10L 15/18 |
| | | | 704/255 |
| 9,262,406 B1 * | 2/2016 | Das | G06F 40/151 |
| 11,210,473 B1 * | 12/2021 | Mariko | G06F 40/30 |
| 11,538,468 B2 * | 12/2022 | Teserra | G10L 15/26 |
| 12,002,456 B2 * | 6/2024 | Teserra | G06F 40/30 |
| 12,204,864 B2 * | 1/2025 | Russell | G06F 40/284 |
| 2023/0214598 A1 * | 7/2023 | Porter | G06F 40/284 |
| | | | 704/9 |

* cited by examiner

*Primary Examiner* — Richard Z Zhu
(74) *Attorney, Agent, or Firm* — Weiss & Arons LLP (57) ABSTRACT

Systems are provided for building semantic frames. Systems may include building a semantic frame using a machine learning algorithm. The algorithm may identify: an index number of a token, a semantic role classifier assigned to the token, a corresponding correlation value and an index number of one or more related tokens. The algorithm may also create a semantic frame using the identified information. Systems may include building semantic frames for multiple tokens within an utterance. Systems may include building semantic frames for a plurality of tokens within a plurality of utterances. The plurality of utterances may be components of a conversation. Systems may also include summarizing the conversation using the semantic frames.

20 Claims, 7 Drawing Sheets

```
604 — "frame": {
        "semanticRole": {
            "annotations": {
                {
        608 ─┤ "startTokenIndex": 1,
             └ "endTokenIndex": 1,
        610 — "role": "action",
        612 — "word": "check",
        614 — "probability": 0.9665006352091203,
        616 — "relations": [
                    {
                618 — "relationType": "action-topic",
                620 — "relatedTo": 3
                    }
                ]
            },
            {
        622 ─┤ "startTokenIndex": 3,
             └ "endTokenIndex": 3,
        624 — "role": "topic",
        626 — "word": "spending",
        628 — "probability": 0.9999685916269979
        630 — "relations": [
                    {
                632 — "relationType": "topic-action",
                634 — "relatedTo": 1
                    }
                ]
            }
        ]
        }
    }
}.
```

FIG. 6B

SEMANTIC FRAME BUILDER

CROSS-REFERENCE TO RELATED APPLICATION

U.S. patent application Ser. No. 17/993,019, entitled, "DYNAMIC SEMANTIC ROLE CLASSIFICATION", filed on even date herewith is hereby incorporated by reference herein in its entirety.

FIELD OF TECHNOLOGY

The field of technology relates to natural language processing. Specifically, this field of technology relates to natural language processing for voice response systems.

BACKGROUND OF THE DISCLOSURE

In recent years, entities have decreased human interactions with callers in favor of interactive voice response systems ("IVRs"). These IVRs communicate with humans using a variety of communication methods. These communication methods include telephone calls, short messaging service ("SMS") messages, multimedia messaging service ("MMS") messages and other suitable communication methods.

Typically, the IVRs respond to a human inquiry using the communication method with which the human initiated the inquiry.

Because of the widespread usage of IVRs, it has become increasingly important to correctly identify the intent of the inquiry and correctly respond to the human inquiry. As such, effort has been placed into technically reproducing a human's response system. Therefore, it would be desirable to have classification module using semantic framing to enable an IVR system to technically reproduce a human's response system.

It would be further desirable for the classification module to classify the components of the inquiry. It would be further desirable to classify these components based on a limited set of semantic classifiers that correspond to the industry category with which the entity is associated. For example, it would be desirable to classify the components of a human inquiry using semantic classifiers for a financial industry, a specific business industry, a government industry or any other suitable industry.

It would be further desirable for the classification module to understand the semantic relationships (also referred to herein, in the alternative, as relations) within the inquiry. It would be further desirable to use the classification module to summarize the human inquiry in computer-readable format.

SUMMARY OF THE DISCLOSURE

Systems, apparatus, and methods for a building a semantic frame are provided. Methods may include receiving, at an entity's IVR system, an utterance from a node. The IVR may be a computing system, network of computing devices, or any other suitable system configured to interact with a node. The IVR may be configured to interact with a node via voice recognition systems, messaging interfaces or any other suitable communication system.

The IVR system may enable communication between a computing device and a node. The node may or may not be a component of the entity's IVR system. As such, the node may be an entity separate from the entity's IVR system. The computing device may be any suitable computing device, such as a desktop, a laptop, a tablet, a smartphone and a mobile device. The node may be a laptop, desktop, smartphone, tablet or any other suitable computing device.

A node may transmit a message to an entity's IVR system. The message may be transmitted via any suitable communication channel. The message may include an utterance. The utterance may be formed with one or more tokens. The one or more tokens may be one or more words. The entity's IVR system may receive the message from the node. The entity's IVR system may receive the utterance included in the message.

Methods may include indexing one or more tokens included in the utterance. Indexing the one or more tokens may include identifying the one or more tokens included in the utterance. Indexing may include identifying the order of the one or more tokens within the utterance. Indexing may also include assigning an index number to each of the one or more tokens. The number assigned to each token may be based on the number of tokens included in the utterance and the position of each of the one or more tokens within the utterance. For example, an utterance may include five tokens, "what is my credit score." The first token in the utterance, the token "what," may be indexed as token one, because it is in a first position in relation to the utterance. The token, "credit," may be indexed as token four because it is a fourth token from the beginning of the utterance.

Upon completion of indexing the tokens, methods may include selecting, from the plurality of tokens, a subset of tokens that are appropriate for, or candidates for, semantic role classification. An utterance may include pronouns, linking verbs, proper nouns and any other word that may not add substantive meaning to the utterance. Tokens that are not used for identifying an intent or providing a response may not be candidates for semantic role classification. For example, in the utterance "what is my credit score?" the token "my," is a pronoun, and therefore may not be selected for semantic role classification. The remaining tokens may be used to identify an intent of the utterance and/or provide a response to the utterance. These remaining tokens may be categorized as the following parts of speech: verbs, nouns and adverbs. Tokens that are categorized as verbs, nouns and adverbs may be selected for semantic role classification. The selected tokens may be placed in a word group, the word group may also be referred to herein, as a word bin. The word bin may be a virtual container for words that are awaiting classification.

Methods also include, assigning a semantic role classifier to each token in the word bin. There may be a group of semantic role classifiers used to assign semantic roles and/or semantic role classifiers to tokens. The group of semantic role classifiers may include one or more semantic role classifiers. The semantic role classifiers, included in the group, may include the following illustrative semantic role classifiers: topic, action, topic-modifier, question and negation.

An action may be understood to mean what is happening in the utterance. An action may be a verb. Each verb may be associated with, or act on, one topic. A topic may be the subject of the action. The topic may be a noun or a compound noun.

A topic modifier may be a word describing the topic. The topic-modifier may be an adjective. The adjective may describe the when, how, and where, in relation to the topic.

A question may include question words, such as, for example, who, what, where, when, why, how, can, could and/or any other suitable question words.

A negation may be a word that negates the meaning of the utterance. Examples of negation may include no, nor and/or not. The group of semantic role classifiers may include any other suitable semantic role classifiers.

A machine learning algorithm may create, for each token, an individual model that corresponds to each semantic role classifier included in the group of semantic role classifiers. As such, the machine learning algorithm may generate, for each token, the number of models equivalent to the number of semantic role classifiers included in the group of semantic role classifiers.

Each token may be processed by each of the models. As such, each token may be classified as each semantic role classifier and a probability may be assigned to the correlation between the token and the classifier. The classification of each token may include calculating a correlation value. The correlation value may be a correlation probability. The correlation value may be a value that the semantic role classifier accurately describes the token being classified.

In one example, a first token may be classified as an action, with a correlation probability of 34%. As such, the machine learning algorithm may determine that the first token can be classified using the first semantic role classifier with a probability of 34%. The first token may then be classified as a topic with a correlation probability of 15%. The first token may be classified as a topic modifier, with a correlation probability of 85%. The first token may be classified as a negation, with a correlation probability of 45%. The first token may be classified as a question, with a correlation probability of 18%. The first token may be classified as any potential semantic role classifier included in the group of semantic role classifiers, with a corresponding correlation probability. In the above example, it should be noted that the topic modifier may have received that highest correlation probability when compared to other semantic role classifiers.

The following is an illustrative example: a first token may be assigned a first semantic role classifier. Assigning the first token to the first semantic role classifier may initiate calculating a correlation value. The correlation value may be calculated based on the strength of the correlation between the token and the semantic role classifier. The process may be repeated for all, or a portion of, the other semantic role classifiers included in the group of semantic role classifiers. The sematic role classifier with the highest correlation value may be assigned to the token.

The classification process, calculation process, and any other processes may be repeated by the machine learning algorithm for all, or a portion of, the tokens selected as semantic role classification candidates. Once all, or a portion of, the selected tokens are assigned semantic role classifiers, the utterance may be identified as a semantically classified utterance.

Methods may also include, building a semantic frame for each of the one or more tokens included in the utterance, using a sematic frame builder. The semantic frame builder may use a machine learning algorithm to build the semantic frame. The semantic frame builder may build the semantic frame using the identified index number of a selected token. The semantic frame builder may use the identified semantic role classifier associated with the selected token. The semantic frame builder may also use the identified correlation value of the selected token and its associated semantic role classifier.

Semantic frame building may also include using a dependency parser to determine any dependency relationships between the selected token and any other of the one or more tokens included in the utterance. The dependency parser may use a machine learning algorithm to identify a part of speech for each token included in the utterance. Parts of speech may include nouns, pronouns, verbs, adjectives, adverbs, prepositions and any other suitable parts of speech. The machine learning algorithm may use the identified parts of speech to determine any dependency relationships between the selected token and the remaining tokens in the utterance. The tokens determined to have a dependency relation with the selected token, may be identified as dependent tokens. The semantic frame builder may identify the index numbers of dependent tokens. The semantic frame builder may use the index number of the dependent tokens to build the semantic frame.

The semantic frame include the index number of the selected token, the semantic role classifier associated with the selected token, the correlation value of the selected token and its associated semantic role classifier, the index number(s) of the dependent token(s) and any other suitable component.

A semantic frame may be built for every token included in the utterance. Each semantic frame may be unique to each token. Multiple semantic frames may be built for multiple utterances. Multiple utterances may be included in a conversation. As such, multiple semantic frames may be built for a conversation. Multiple semantic frames may be built for multiple conversations.

The semantic frames may be used to generate a summary of one or more conversations. The summary may be generated by the machine learning algorithm. The machine learning algorithm may use the dependencies identified with the dependency parser to reduce a conversation into a summary. The machine learning algorithm may use dependencies to identify the main points of a conversation. The machine learning algorithm may reduce, or remove, any non-advantageous information or tokens. The machine learning algorithm may assign a significance score to each utterance within the conversation. The machine learning algorithm may assign a most recent utterance a highest significance score among the plurality of utterances within the conversation.

At times, the semantic frame builder may use a Java®-based model. The semantic role classifier may also use any suitable model for semantic frame building.

The machine learning algorithm may use the semantically classified utterance along with the semantic frames to predict an intent of the utterance. The machine learning algorithm may provide a response to the utterance based on the predicted intent. The response may be provided in the same format in which the message was received. As such, the response may be provided as a voice response, a message response, a chat response or any other suitable response.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION OF THE DISCLOSURE

Apparatus, methods, and systems for a semantic frame builder is provided. Apparatus may include an entity IVR system. The IVR system may be a computing system, a network of computing devices, or any other suitable communication system. The IVR system may be comprised of one or more computing devices. The computing devices included in the IVTR system may be laptops, desktops, mobile phones, smartphones, tablets or any other suitable computing device.

The computing device may include all or some of natural computing components. The computing device may include some or all of the following: RAM, ROM, input/output modules, non-transitory memory, nonvolatile memory, processors, EEPROM, or any other suitable computing components. The memory may store operating systems, application systems, data, video, text, and/or audio assistance files.

The computing devices of the entity IVR system may be connected in a network. The network may be a local area network (LAN) or a wide area network (WAN). The network may be a public network. The network may be a private network. The network may be an edge computing network. The network may be connected via TCP/IP, Ethernet, FTP, HTTP and any other suitable network connection.

The entity IVR system may be configured to receive one or more communications from node computers. Node computers may or may not be a component in the IVR network. The node computer may be an entity separate from the entity's IVR system. The node may be a laptop, smartphone, desktop, tablet, or any other suitable computing device. The node may include some or all the components of a computing device listed above.

A node may be configured to transmit a message to the entity IVR system. The message may be transmitted in the form of text, chat, voice and/or any other suitable message delivery applications. The message may include an utterance.

The IVR system may be configured to receive the utterance included in the message. The IVR system may be configured to index the utterance. Indexing the utterance may include identifying the tokens included in the utterance. The tokens may be words that are included in the utterance. Indexing the utterance may also include identifying a position of each token within the utterance. Indexing may include identifying a number of tokens included in the utterance. Indexing may also include assigning an index number to each of the tokens. The index number assigned to each token may be based on the position of the token and the number of tokens within the utterance.

The apparatus may further include a machine learning algorithm. The machine learning algorithm may reside on a hardware processor. The hardware processor may be included in the entity computing device. The hardware processor may operate in tandem with a hardware memory.

The machine learning algorithm may be configured to select tokens for semantic role classification. There may be tokens within an utterance that may not add substantive meaning to the utterance. Tokens that do not add substantive meaning may not be candidates for semantic role classification. Semantic role classification may process the utterance to provide possible intents for the utterance. Therefore, tokens that may add substantive meaning may be processed using semantic role classification. The machine learning algorithm may select tokens for semantic role classification.

The semantic role classifier may be comprised of a group of sematic role classifiers. The group of semantic role classifiers may include semantic role classifiers such as: action, topic, topic-modifier, question and negation. The group of semantic role classifiers may include any other suitable semantic role classifiers.

For each selected token, the machine learning algorithm may be configured to instantiate a model for each semantic role classifier within the group of semantic role classifiers. The selected token may be evaluated in contrast to each of the semantic role classifiers. The pairing of each semantic role classifier with the selected token may be assigned a value. The value may be a correlation value. The correlation value may represent the degree to which the selected token and the semantic role classifier are associated.

The machine learning algorithm may be further configured to calculate a threshold value. The threshold value may be a predetermined value. The threshold value may be a threshold correlation value. The threshold value may be a base value that the correlation value may surpass in order to assign a specific semantic role classifier to a selected token. The predetermined threshold value may be determined based on industry-specific classifiers. The predetermined threshold value may be a minimum value.

At times, upon the calculation of correlation values between a first token and a plurality of semantic role classifiers, there may be more than one semantic role classifier that is assigned a correlation value that is greater than the predetermined threshold value. As such, the machine learning algorithm may be configured to compare the calculated correlation values. The semantic role classifier that has been assigned the highest correlation value, in the group of semantic role classifiers, may be the semantic role classifier that has the greatest association with the selected token. The semantic role classifier with the highest correlation value may be assigned to the selected token.

The machine learning algorithm may be further configured to build a semantic frame. The semantic frame may be built for each token included in the utterance. The machine learning algorithm may be configured to select a token. The machine learning algorithm may be further configured to identify one or more of the following: an index number of the selected token, a semantic role assigned to the selected token, a correlation value between the selected token and its associated semantic role, any relationships between the selected tokens and any other token within the utterance.

Relationships may be determined using a dependency parser. The dependency parser may identify a part of speech for every token within the utterance. Parts of speech may include, verbs, nouns, adjectives, adverbs, prepositions or any other suitable parts of speech. Based on the identified parts of speech, the dependency parser may identify dependencies within the utterance. The dependencies may determine relationships within the utterance. For example, the following utterance "why did I get charged a monthly maintenance fee," includes nine tokens. Each of the tokens may be assigned a part of speech. The token "charged," may be identified as a verb. The tokens "maintenance" and "fee" may be identified as nouns. The dependency parser may further identify a relation between the tokens, "maintenance" and "fee." The dependency parser may identify that "fee" depends on "maintenance," and therefore, there may be a relationship between the two tokens. As such, "maintenance fee," may be a compound noun. The dependency parser may determine dependencies and relationships for the tokens within the utterance.

The tokens determined to have a relationship with the selected tokens may be referred to as dependent tokens. The dependency parser may identify the index number(s) of the one or more dependent tokens.

The machine learning algorithm may build a semantic frame for a selected token. The semantic frame may be built based on the identified index number of the selected token, the identified semantic role classifier assigned to the selected token, the identified correlation value of the selected token and its associated semantic role classifier and the identified index number of any the dependent tokens. There may be tokens that do not have any dependencies within the utterance. Semantic frames corresponding to tokens that do not have dependencies may not include dependencies. Semantic frames may be created for one or more tokens included in the utterance.

Semantic frames may be built for a plurality of tokens included in a plurality of utterances. Semantic frames may be built for a plurality of utterances. The plurality of utterances may compose a conversation. The machine learning algorithm may be configured to summarize the conversation. The machine learning algorithm may use the semantic frames to summarize the conversation. The use of semantic frames may enable the removal of redundancies. Using the identified dependencies, the machine learning algorithm may create a summary of the conversation. The summary may be a brief synopsis of the conversation. The summary may be completed through reduction of extra, repeated and/or non-advantageous parts of the conversation. Extra, repeated and/or non-advantageous parts of the conversation may be identified based on semantic role classification, correlation values and relationships identified by the dependency parser.

The semantic frames may be dynamically updated. The semantic frames may be changed or revised based on user input, increased machine understanding of one or more intents and/or updates in semantic role classification.

The machine learning algorithm may use the semantically classified utterance and the semantic frames to identify potential intents to the utterance. Based on the semantic classification and sematic frames, the machine learning algorithm may select an intent of the utterance. Based on the identified intent, the machine learning algorithm may provide a response to the utterance. The response may be sent from the entity IVR to the node via any suitable communication method.

The semantic frame builder may use a Java®-based model. The semantic frame builder may use any suitable model for semantic frame building.

Illustrative method steps may be combined. For example, an illustrative method may include steps shown in connection with another illustrative method.

Apparatus may omit features shown or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

The steps of methods may be performed in an order other than the order shown or described herein. Embodiments may omit steps shown or described in connection with illustrative methods. Embodiments may include steps that are neither shown nor described in connection with illustrative methods.

Figure 1:
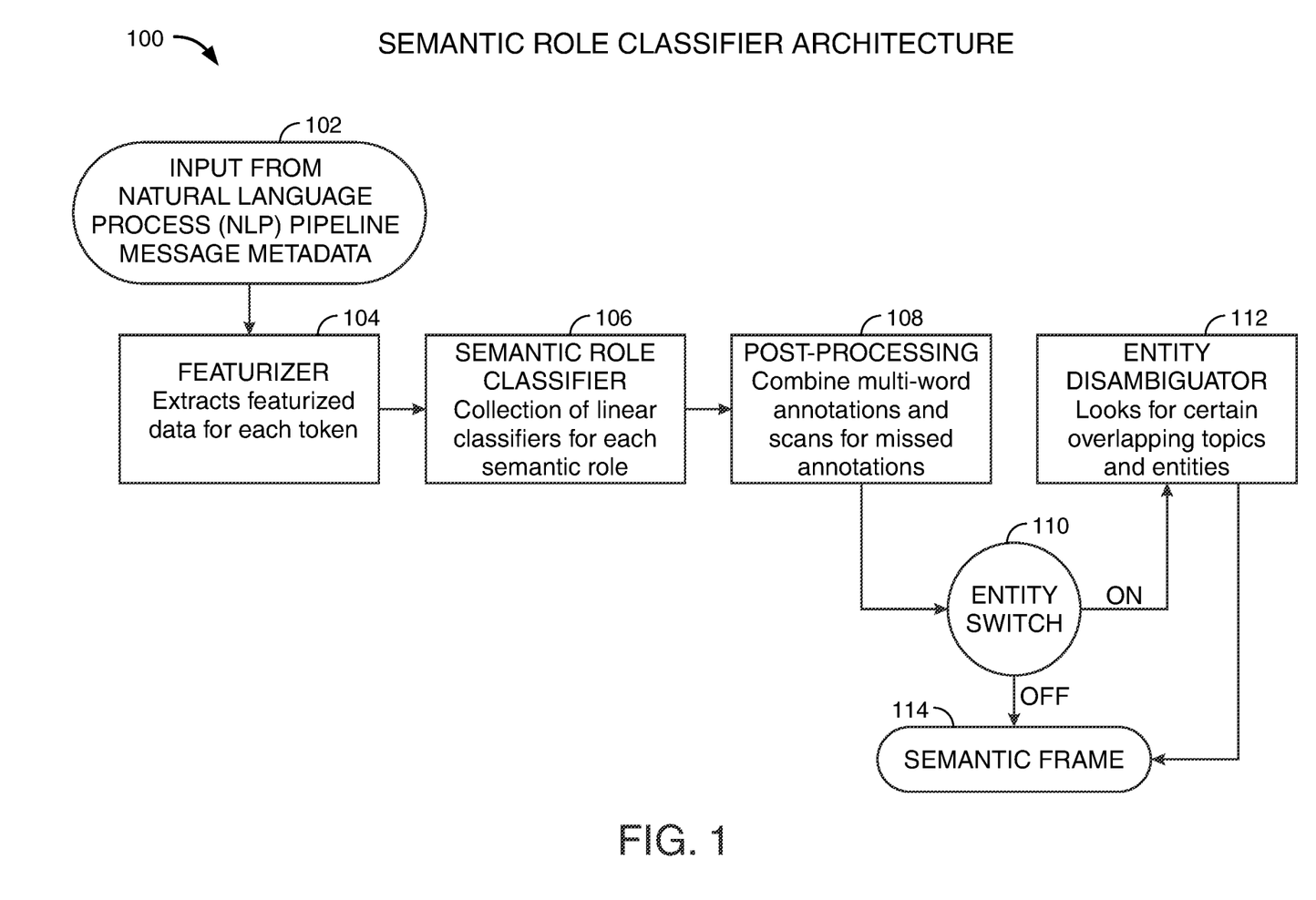
FIG. 1 shows an illustrative diagram in accordance with principles of the invention.

FIG. 1 shows illustrative process 100. Illustrative process 100 begins at step 102. At step 102 an input from a natural language processor ("NLP") pipeline may be sent to the semantic role classifier. The input from the NLP pipeline may be an utterance. The utterance may include metadata. The utterance may be comprised of one or more tokens. The utterance may be sent from a node to an entity IVR system. The entity IVR system may include the NLP pipeline. The utterance may be processed through the NLP pipeline into a semantic role classifier.

At step 104, the utterance may be processed at a featurizer. The featurizer may extract featurized data for each token included in the utterance. The featurizer may index the tokens. The featurizer may identify the one or more tokens. The featurizer may identify the position of the one or more tokens within the utterance. The featurizer may assign a number to each of the one or more tokens based on the position of the one or more tokens within the utterance. The featurizer may extract metadata from one or more tokens within the utterance. The metadata may include part of speech data, data relating to user that transmitted the utterance and any other suitable data. The featurizer may select which tokens should be classified by the semantic role classifier. The featurizer may place the selected tokens in a virtual word bin.

At step 106, the selected tokens may be assigned a semantic role classifier. The semantic role classifier, shown at step 106, may be connected to a database of semantic role classifiers. The database of semantic role classifiers may include a plurality of predetermined semantic roles. Examples of the semantic role classifiers included in the database, may include action, topic, topic-modifier, negation and question.

At step 106, the semantic role classifier may assign a semantic role classifier to each of the selected tokens. The selected tokens may have been previously selected at step 104. For each selected token, the semantic role classifier may create a plurality of models. Each model, included in the plurality of models, may be a pairing of the selected token with each semantic role classifier included in the group of semantic role classifiers. Each pairing between the selected token with each sematic role classifier may be assigned a correlation value. The pairing between the selected token and its associated semantic role classifier, with the highest correlation value, may be assigned to the selected token. The correlation value of the semantic role classifier assigned to the selected token may meet, or exceed, a predetermined threshold value. If the correlation value of the semantic role classier does not meet, or exceed, the predetermined threshold value, the semantic role classifier may not be assigned to the selected token.

Step 108 shows post-processing. The semantic role classifier may combine multi-word annotations. Post-processing, shown at step 108, may also include scanning for missed annotations within the utterance.

At step 110, the semantic role classifier may determine if there is an entity switch is advantageous. If an entity switch is determined to be advantageous, the process may proceed to step 112. If an entity switch is determined not to be advantageous, the process may proceed to step 114.

Step 112 may include an entity disambiguator. Entity disambiguator 112 may look for certain overlapping topics and entities. After step 112, the process may proceed to step 114.

Step 114 may include creating one or more semantic frames based on the semantic role classification. The semantic frame may include the index number of a selected token, the associated semantic role classifier, the correlation value of the selected token and its associated semantic role classifier and the index number of any related tokens within the utterance. The semantic frame may provide a plurality of detailed layers to the utterance.

Figure 2:
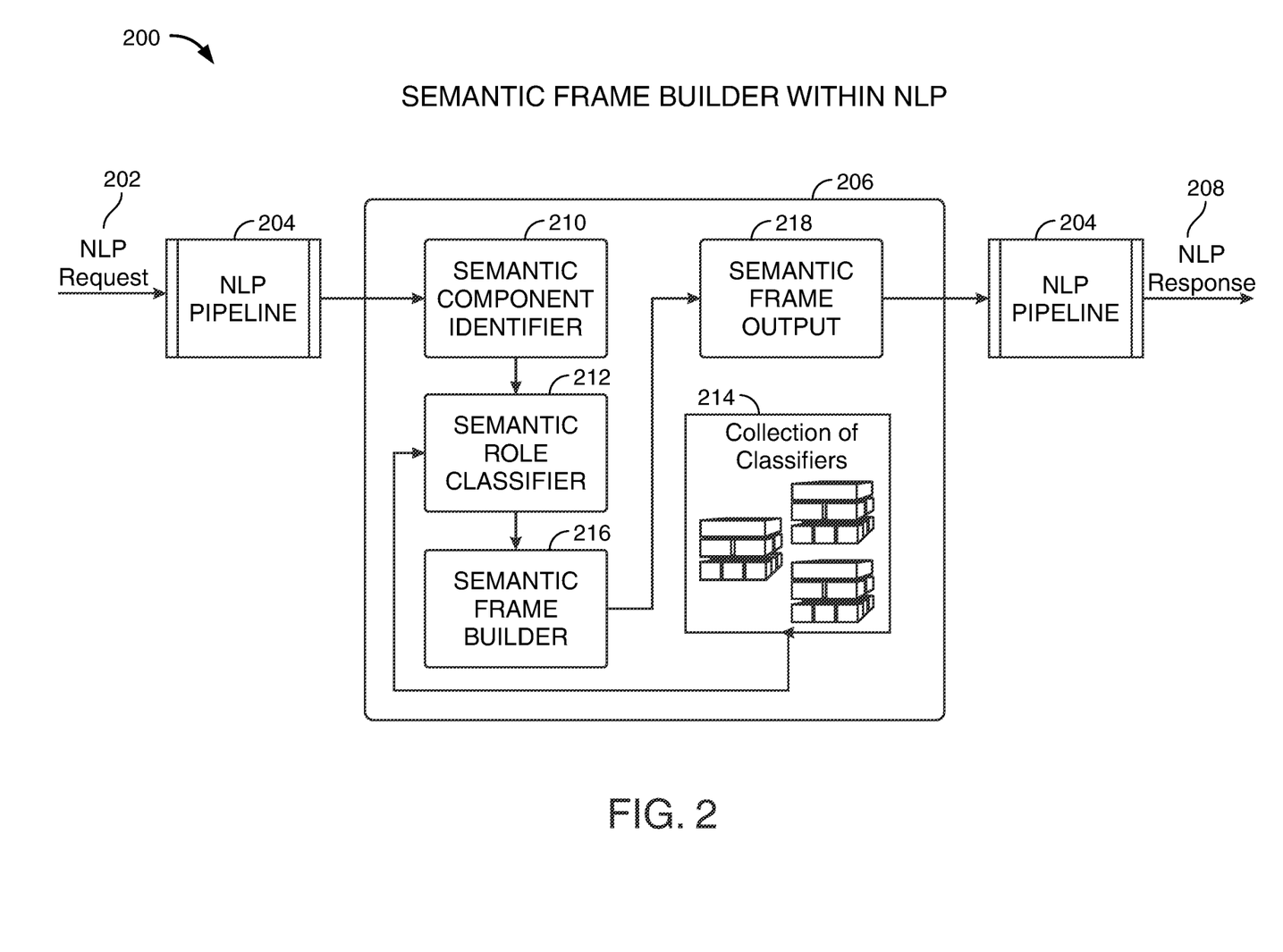
FIG. 2 shows another illustrative diagram in accordance with principles of the invention.

FIG. 2 shows illustrative process 200. Illustrative process 200 shows semantic frame building system 206 within natural language process (NLP) pipeline 204. NLP request 202 may be received via NLP pipeline 204. NLP request 202 may include an utterance. The utterance may be transmitted from a node to an entity IVR system. NLP pipeline 204 may be included in the entity IVR system. Semantic frame building system 206 may be instantiated in NLP pipeline 204. NLP request 202 may be passed through NLP pipeline 204 into semantic frame building system 206.

Semantic component identifier 210 may receive NLP request 202. Semantic component identifier 210 may include featurizer 104 (shown in above FIG. 1). Semantic component identifier 210 may index the tokens, included in the utterance, and select tokens that are candidates for semantic role classification.

Semantic role classifier 212 may have the same or similar functions as semantic role classifier 106 (shown in above FIG. 1). Semantic role classifier 212 may assign a semantic role classifier to each selected token. Semantic role classifier 212 may assign semantic roles from collection of classifiers 214. Collection of classifiers 214 may include classifiers such as topic, action, topic-modifier, question, negation and any other suitable semantic role classifier.

Once semantic role classifier 212 assigns a semantic role classifier to the selected token, semantic frame builder 216 may be instantiated. Semantic frame builder 216 may include building a semantic frame using data previously identified. Semantic frame builder 216 may use the index number of the selected token, identified using semantic component identifier 210. Semantic frame builder may use the semantic role assigned to the token and its corresponding correlation value, identified using semantic role classifier 212.

Semantic frame builder 216 also may include a dependency parser. The dependency parser may determine relationships and dependencies between the selected token and the remaining tokens included in the utterance. The dependency parser may use the parts of speech of each of the one or more tokens, included in the utterance, to determine the dependencies and relations between the tokens. The dependency parser may identify the index number of the tokens that are dependent on, or related to, the selected token. Semantic frame builder 216 may build a frame. The frame may include the index number of the selected token, the semantic role assigned to the selected token and its corresponding correlation value and the index numbers of the tokens determined to relate and/or depend on the selected token.

Each token, included in the utterance, may be passed through semantic frame building system 206. Because the semantic frame is built based on the identified information relating to each token, a unique semantic frame may be built for each token within an utterance.

Once semantic frame builder 216 builds a semantic frame for the selected token, semantic frame output 218 is provided. Semantic frame output 218 may include each token in NLP request 202, its corresponding semantic role classifiers and/or its corresponding semantic frame. Semantic frame output 218 may be transmitted through NLP pipeline 204. NLP response 208 may be determined using the information included in semantic frame output 218. NLP response 208 may be a response to NLP request 202.

Figure 3:
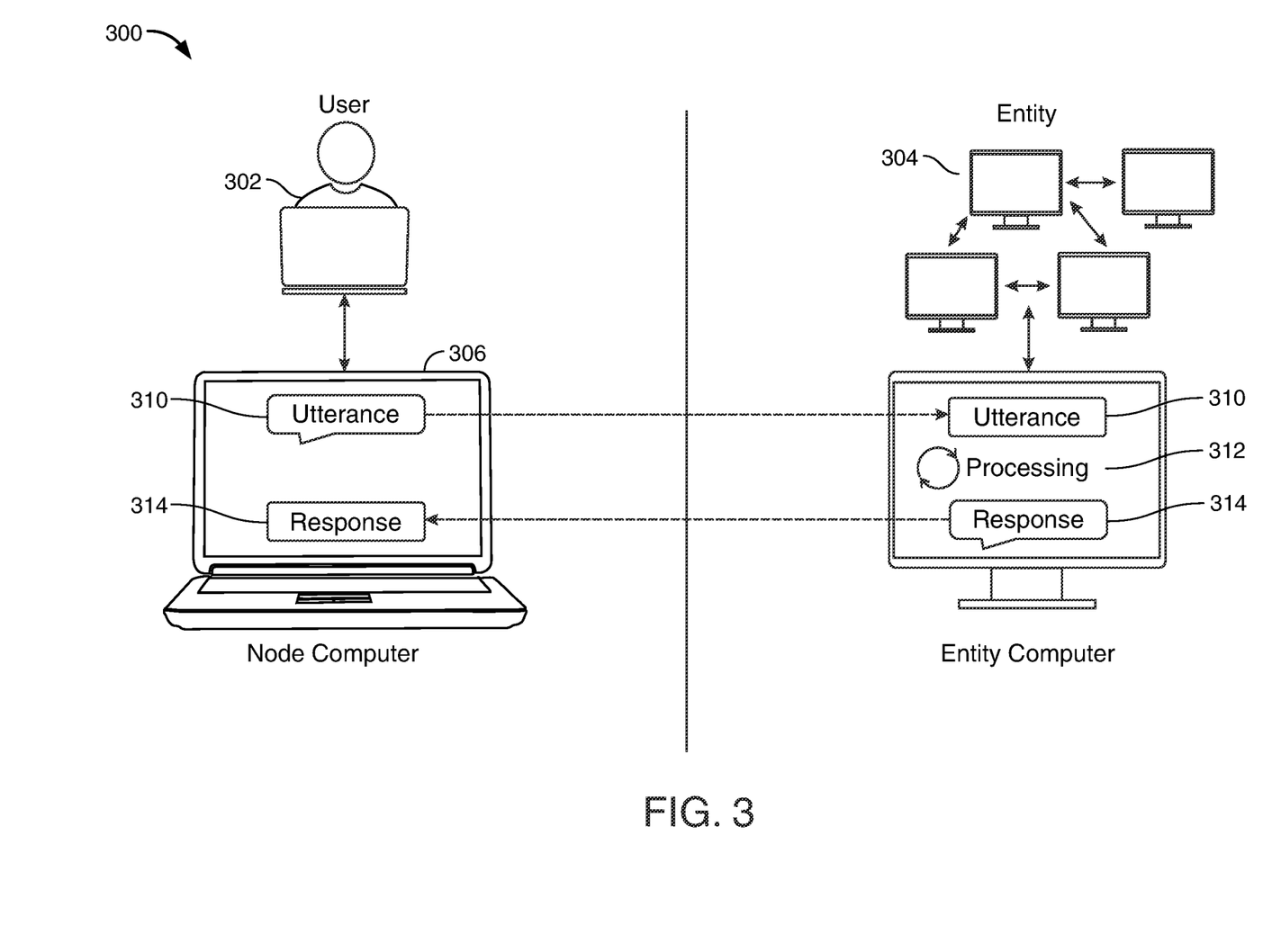
FIG. 3 shows yet another illustrative diagram in accordance with principles of the invention.

FIG. 3 shows illustrative process 300. Illustrative process 300 may include user 302. User 302 may be any suitable node communicating with entity 304 through a communication system, such as an IVR system. User 302 may use node 306 to communicate with entity 304.

Node 306 may be a laptop, smartphone, tablet, desktop, or any other suitable computing device. Entity 304 may be a network of nodes, a computing system or any other suitable entity network. User 302 may transmit utterance 310 to entity 304. Utterance 310 may be a question relating to user 302 and entity 304. Utterance 310 may be any form of any suitable communication between user 302 and entity 304. Entity 304 may receive utterance 310. Entity 304 may send utterance 310 for processing 312. Processing 312 may include assigning semantic role classifiers to tokens included in utterance 310. Processing may also include building a semantic frame for utterance 310. Using the semantic role classifiers and the semantic frame, entity 304 may identify an intent of utterance 310. Based on the intent, entity 304 generate response 314 to utterance 310. Entity 304 may also transmit response 314. User 302 may receive response 314.

Figure 4:
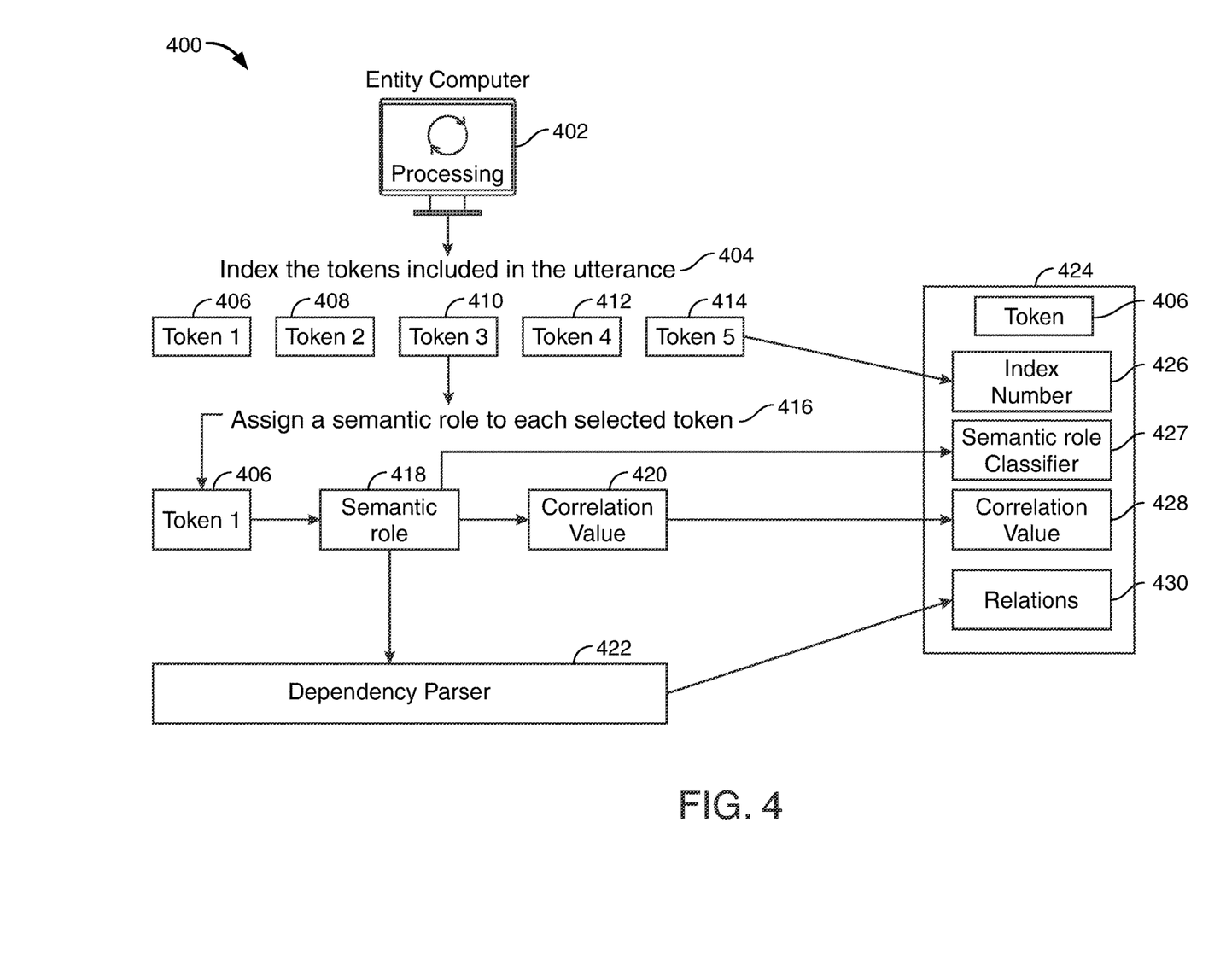
FIG. 4 shows still another illustrative diagram in accordance with principles of the invention.

FIG. 4 shows illustrative process 400. Illustrative process 400 shows processing 402 (also shown in FIG. 3). Processing 402 may include indexing 404. Indexing 404 may include identifying the tokens included in the utterance. Indexing 404 may include identifying tokens 406, 408, 410, 412, and 414. Indexing 404 may include assigning an index number to the tokens identified, based on a position of each token within the utterance, from left to right. Token 406 may be the first token within the utterance and therefore may be assigned an index number of one. Token 408 may be the second token within the utterance and therefore may be assigned an index number of two. Token 410 may be the third token within the utterance and therefore may be assigned an index number of three. Token 412 may be the fourth token with the utterance and therefore may be assigned an index number of four. Token 414 may be the fifth token within the utterance and therefore may be assigned an index number of five.

Processing 402 may include semantic role classification 416. Semantic role classification 416 may include assigning a semantic role to each of the selected tokens. Token 406 may be assigned to semantic role 418 with a corresponding correlation value 420. Tokens 408, 410, 412, and 414 may also be selected for semantic role classification.

Processing 402 may further include dependency parser 422. Dependency parser 422 may be configured to analyze the selected tokens for any dependency relation with any other token included in the utterance. Dependency parser 422 may identify the parts of speech of the tokens included in the utterance. Dependency parser 422 may identify dependencies using the identified parts of speech.

Semantic frame 424 may include token 406, index number 426, semantic role classifier 427, correlation value 428, and relations 430. Token 406 may be 'token 1'. Index number 426 may be the index number assigned to token 406 in indexing 404. Index number 426 may be one. Semantic role classifier 427 may be assigned in semantic role classification 416. Correlation value 420 may be assigned in semantic role classification 416. Relations 430 may be identified using dependency parser 422.

Figure 5:
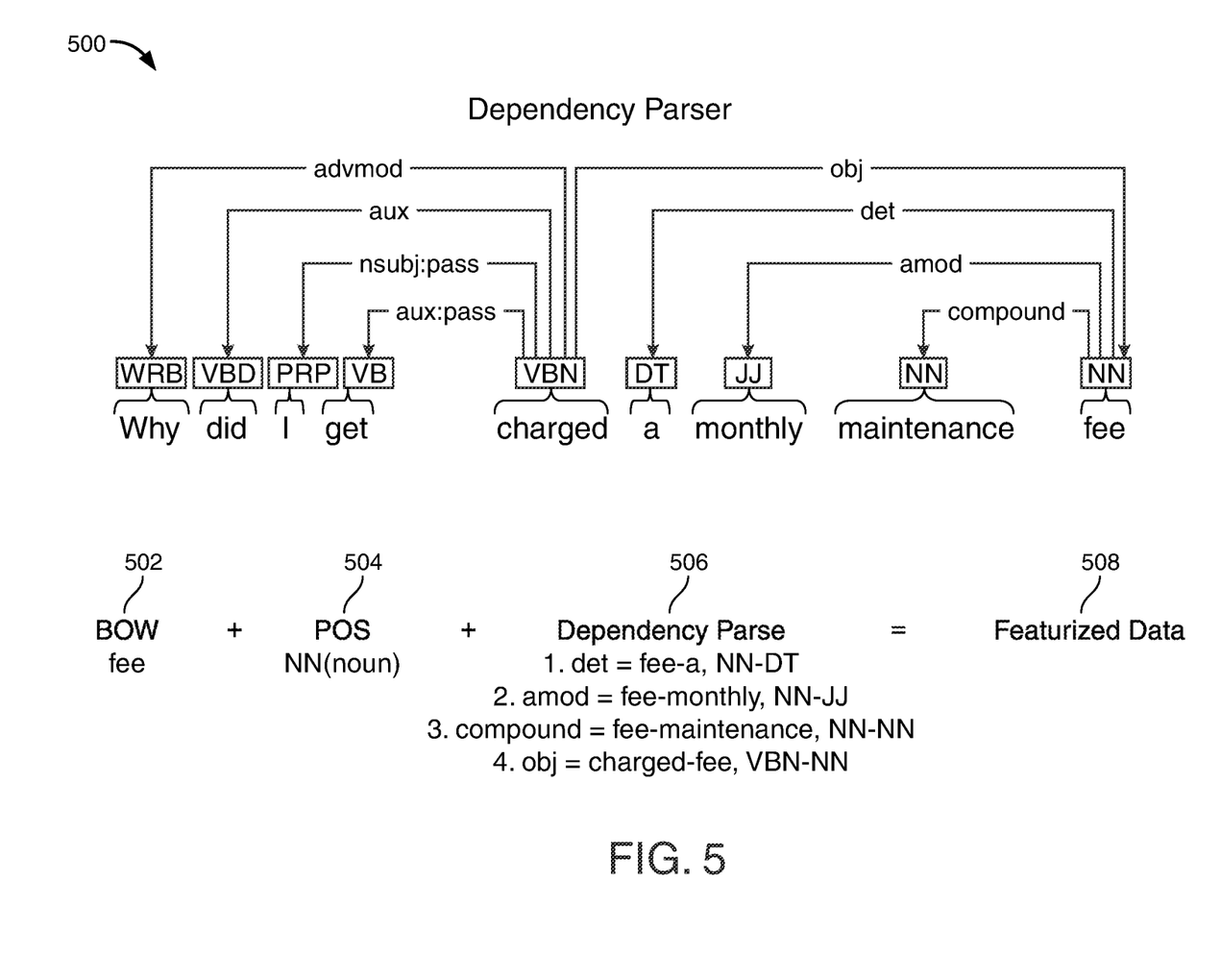
FIG. 5 shows yet another illustrative diagram in accordance with principles of the invention.

FIG. 5 may show illustrative process 500. Illustrative process 500 shows dependency parser 422 (shown in FIG. 4). Dependency parser may include bag of words ("BOW") 502. Bag of words 502 may include the tokens included in the utterance. The tokens included in the utterance may include the following words: Why did I get charged a monthly maintenance fee.

Dependency parser may include part of speech 504. Part of speech 504 may include nouns, verbs, prepositions, pronouns, adjectives, adverbs or any other suitable part of speech. Each word included in the bag of words may be assigned a part of speech. The word "why" may be assigned an adverb part of speech, indicated by the acronym WRB. The word "did" may be assigned an irregular verb part of speech, indicated by the acronym VBD. The word "I" may be assigned a pronoun part of speech, indicated by the acronym PRP. The word "get" may be assigned a verb part of speech, indicated by the acronym VB. The word "charged" may be assigned a verb modifying a noun part of speech, indicated by the acronym VBN. The word "a" may be assigned a determiner part of speech, indicated by the acronym DT. A determiner may be an article that determines the definiteness and specificity of a noun. The word "monthly" may be assigned an adjective part of speech, indicated by the acronym JJ. The word "maintenance" may be assigned a noun part of speech, indicated by the acronym NN. The word "fee" may be assigned a noun part of speech, indicated by the acronym NN.

The word charged may be modified by the adverb Why, as indicated by the arrow stating advmod. Advmod may be an abbreviation for adverb modifier.

The verb did may indicate the tense of the verb charged, as indicated by the arrow stating aux. Aux may be an abbreviation for auxiliary. An auxiliary verb may indicate the tense of another verb.

The pronoun I may be a passive noun subject of the verb charged, as indicated by the arrow stating nsubj:pass. Nsubj:pass may be an abbreviation for noun subject passive.

The verb get may be a passive auxiliary verb for the verb charged, as indicated by the arrow stating aux:pass. Aux:pass may be an abbreviation for auxiliary passive.

The verb modifying a noun charged may be an object for the noun fee, as indicated by the arrow stating obj. Obj may be an abbreviation for object.

The noun fee may be a determined by the word a, as indicated by the arrow stating det. Det may be an abbreviation for determiner.

The noun fee may be modified by the adjective monthly, as indicated by the arrow stating amod. Amod may be an abbreviation for adjective modifier.

The noun fee may be a compound noun with the noun maintenance, as indicated by the arrow stating maintenance.

Dependency parser 506 may use parts of speech 504 to identify dependencies within bag of words 502.

Dependecies may include the relationships between words, such as adverb modifier, auxiliary, passive subject, passive auxiliary, object, determiner adjective modifier, compound and any other suitable relationships.

Bag of words 502, part of speech 504, and dependency parser 506 may combine to create featurized data 508. Featurized data 508 may include indexed dependency relationships.

An example may be shown. The word fee may be identified as a noun. The dependency parser may indicate four relationships with the word fee. A first relationship may be a determiner relationship; the word a may be a determiner for the word fee. A second relationship may be an adjective modifier relationship; the word monthly may modify the noun fee. A third relationship may be a compound relationship; the word maintenance may be combined with the word fee to produce a compound noun. A fourth relationship may be an object relationship; the word charged may be an object of the noun fee. The featurized data may include the words, the parts of speech and the dependencies with other words included in an utterance.

Figure 6A:
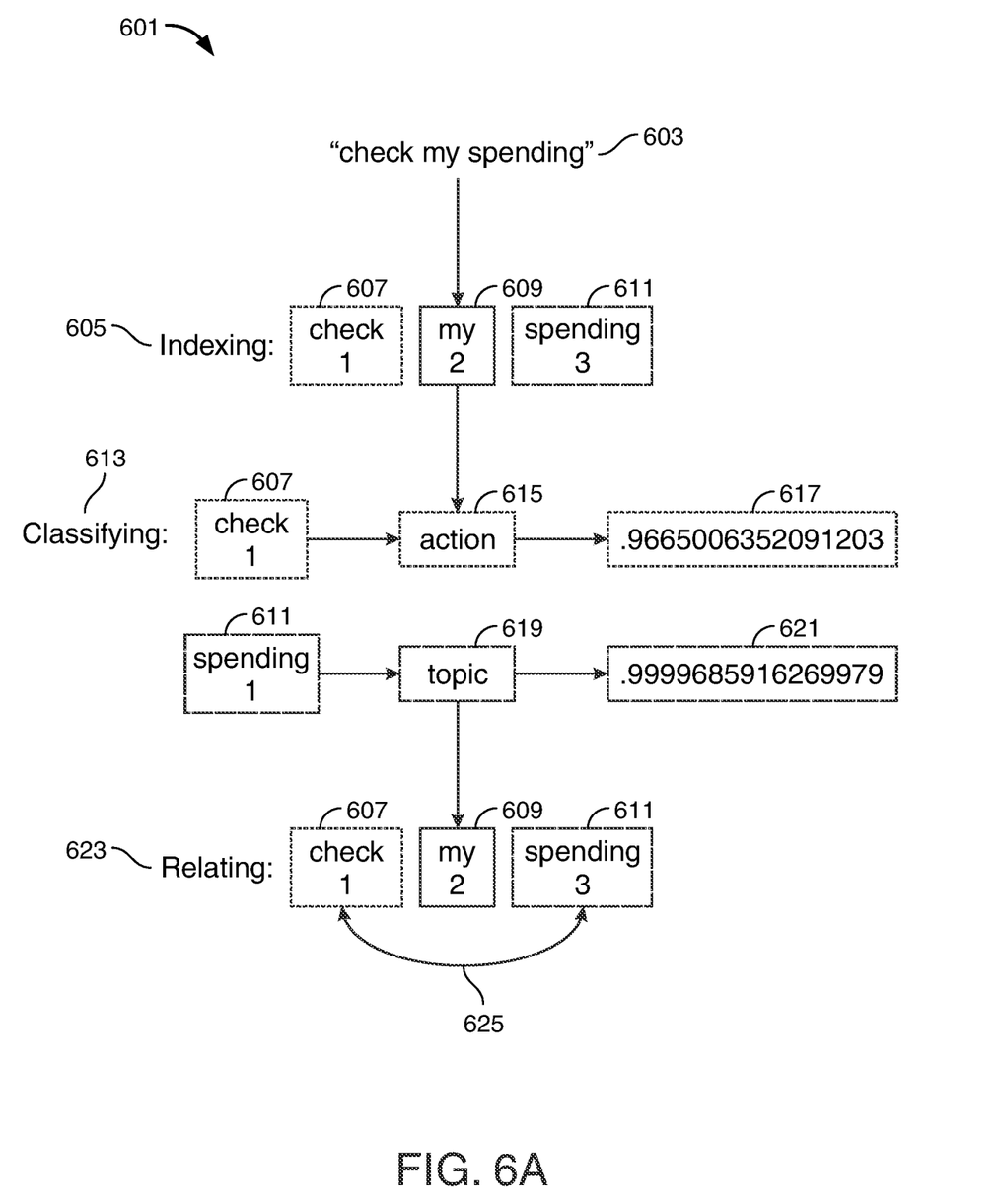
FIG. 6A Shows yet another illustrative diagram in accordance with principles of the invention.

FIG. 6A shows illustrative diagram 601. Illustrative diagram 601 may start with utterance 603. Utterance 603 may recite "check my spending." Indexing 605 may include indexing the tokens included in utterance 603. Token 607, 'check,' may be indexed as token one. Token 609, 'my,' may be indexed as token two. Token 611, 'spending,' may be indexed as token three. Classifying 613 may include semantic role classification. Classifying 613 may include classifying tokens 607 and 611. Token 607 may be classified as action 615 with correlation value 617 (0.9665006352091203). Token 611 may be classified as topic 619, with correlation value 621 (0.9999685916269979). Relating 623 may include using a dependency parser to determine relationship 625. Relationship 625 may relate token 607 to token 611. The 'check' action may be related to the 'spending' topic.

Figure 6B:
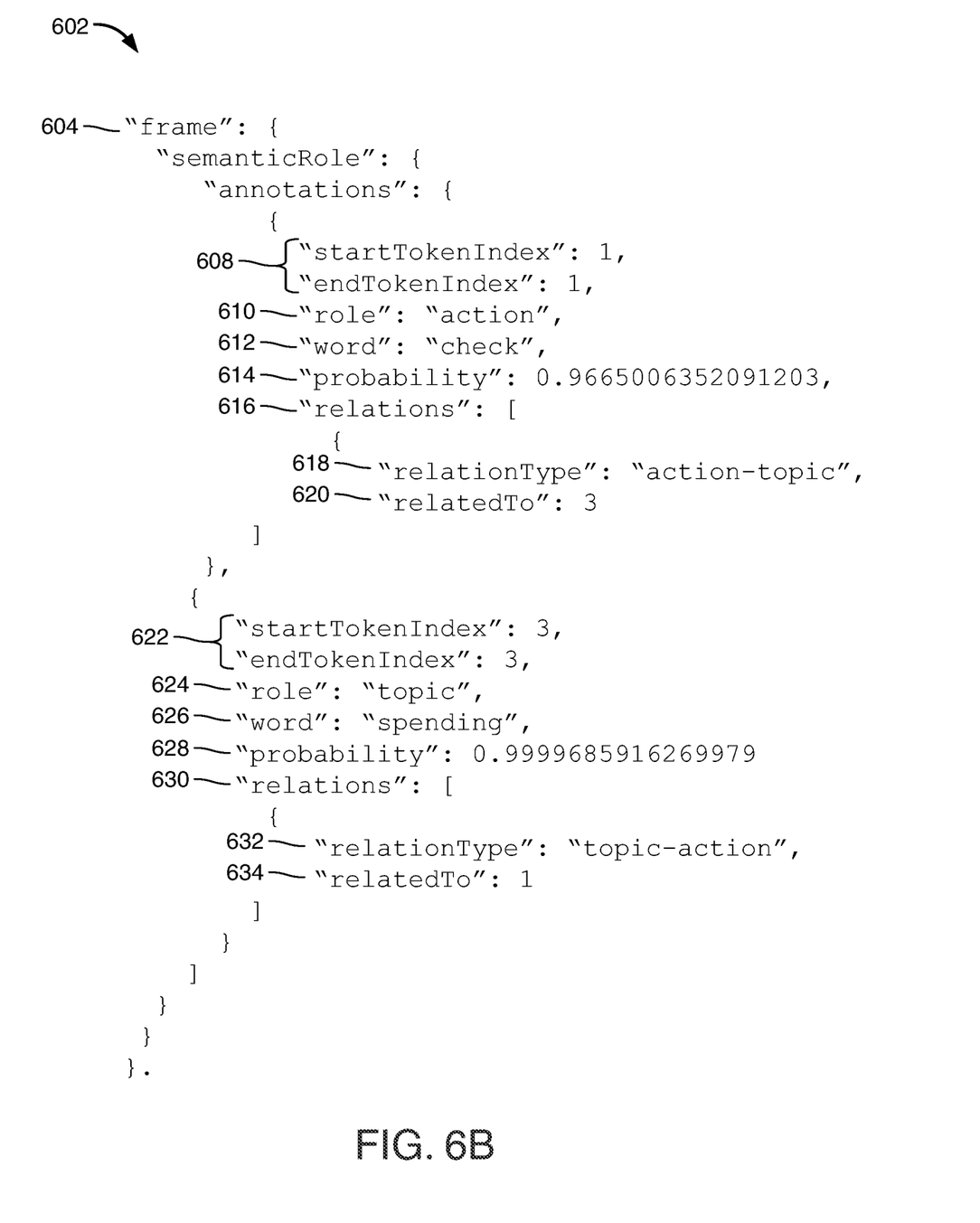
FIG. 6B shows yet another illustrative diagram in accordance with principles of the invention.

FIG. 6B shows illustrative code 602. Illustrative code 602 shows a semantic frame for utterance 603 (shown in FIG. 6A). Illustrative code may include frame 604 which includes index 608. Index 608 may refer to a first token within an utterance. Index 608 may be one. Code 602 may include role 610. Role 610 may be a semantic role classifier. Role 610 may be 'action.' Word 612 may also be included in code 602. Word 612 may be a token included in the utterance. Word 612 may be the word of the first token in utterance 603 (shown in FIG. 6A). Word 612 may be "check." Word 612 and role 610 may have probability 614. Probability 614 may be a correlation value of the semantic role classifier and its associated token. Probability 614 may be 0.9665006352091203. Code 602 may include relations 616. Relations 616 may include relations type 618. Relations type 618 may describe the relation. Relation type 618 may be 'action-topic.' Relations 616 may also include related-to 620. Related-to 620 may include the index number of the related token. The first token 'check', classified as an action, may be related to the third token 'spending', classified as a topic.

Illustrative code may also include index 622. Index 608 may be three. Index 622 may refer to a third token within utterance 603 (shown in FIG. 6A). Code 602 may include role 624. Role 624 may be a semantic role classifier. Role 624 may be 'topic.' Word 626 may also be included in code 602. Word 626 may be a token included in the utterance. Word 626 may be the word of the first token in utterance 603 (shown in FIG. 6A). Word 626 may be "spending." Word 626 and role 624 may have probability 628. Probability 628 may be a correlation value of the semantic role classifier and its associated token. Probability 628 may be 0.9999685916269979. Probability 628 may be calculated out of one. A such, the probability expressed as a percentage may be 99%. Code 602 may include relations 630. Relations 630 may include relations type 632. Relation type 632 may describe the relation. Relation type 632 may be 'topic-action.' Relations 630 may also include related-to 634. Related-to 634 may include the index number of the related token.

Thus, methods and apparatus for SEMANTIC FRAME BUILDING are provided. Persons skilled in the art will appreciate that the present disclosure can be practiced by other than the described embodiments, which are presented for purposes of illustration rather than of limitation, and that the present disclosure is limited only by the claims that follow

What is claimed is:

1. A method for building semantic frames, the method further comprising:
    receiving, at an entity Interactive Voice Response (IVR) system, an utterance, via a natural language process (NLP) pipeline, said utterance being transmitted from a network node to the entity IVR system;
    extracting featurized data included in the utterance, said extracting comprising:
        tokenizing the utterance into a plurality of tokens;
        indexing the plurality of tokens, said indexing comprising assigning an index number to each token included in the plurality of tokens, said index number based on a position of each token within the utterance; and
        extracting metadata for each token included in the plurality of tokens;
    classifying each token, within the plurality of tokens using a plurality of semantic role classifiers, said classifying comprising:
        selecting one or more tokens from the plurality of tokens for semantic role classification;
        assigning a semantic role classifier to each of the one or more selected tokens;
        for each of the one or more selected tokens, identifying a correlation value between each semantic role classifier, included in the plurality of semantic role classifiers, and a selected token;
        for each of the one or more selected tokens, finalizing an associated semantic role classifier, said finalizing based on determining the associated semantic role classifier having a correlation value that is a highest correlation value; and,
        for each of the one or more selected tokens, determining whether there is a dependency relationship with any of other tokens, included in the plurality of tokens, said tokens that are determined to have a dependency relationship being identified as dependent tokens, said determining comprising storing index numbers of the dependent tokens;
    building a semantic frame for each selected token, said semantic frame comprising:
        the index number of the selected token;
        the semantic role classifier assigned to the selected token;
        the correlation value of the selected token and the associated semantic role classifier; and
        the index numbers of the one or more dependent tokens within the plurality of tokens.

2. The method of claim 1, further comprising using a machine learning algorithm to build the semantic frame.

3. The method of claim 1, further comprising building semantic frames for a plurality of utterances, said plurality of utterances occurring in a conversation.

4. The method of claim 3, further comprising generating a summary of the conversation using the semantic frames, said generating the summary of the conversation using the dependent tokens to reduce redundant and non-advantageous tokens from the conversation.

5. The method of claim 4, the method further comprising assigning a highest significance score to a most recent utterance.

6. The method of claim 1, wherein the semantic frame, for each token, provides a plurality of layers to the utterance.

7. The method of claim 1, further comprising using a dependency parser to identify a dependency between a selected token and any of the other one or more tokens included in the plurality of tokens.

8. The method of claim 1, wherein the method uses a Java®-based model.

9. The method of claim 1, further comprising predicting, for a first utterance, based on a plurality of intents and a plurality of semantic frames generated for the first utterance, a response to the first utterance.

10. A method for building a semantic frame, the method further comprising:
    receiving, at an entity Interactive Voice Response (IVR) system, a plurality of utterances via a natural language process (NLP) pipeline, said plurality of utterances being transmitted from a plurality of nodes to the entity IVR system;
    extracting featurized data included in the plurality of utterances, said extracting comprising:
        tokenizing each of the plurality of utterances into a plurality of tokens;
        indexing each plurality of tokens, said indexing comprising assigning an index number to each token included in the plurality of tokens, said index number based on a position of each token within the utterance; and
        extracting metadata for each token included in the plurality of tokens;
    classifying each token, within the plurality of tokens, using a plurality of semantic role classifiers, said classifying comprising:
        selecting one or more tokens from the plurality of tokens for semantic role classification;
        for each of the one or more selected tokens, identifying a correlation value between each of the plurality of semantic role classifiers and the selected token;
        assigning a semantic role classifier to each of the one or more tokens, said assigned semantic role classifier having a correlation value that is a highest correlation value from a plurality of correlation values;
        for each of the one or more selected tokens, determining a subset of tokens that includes a dependency relation with any of the other one or more tokens included in the plurality of tokens;
        identifying each token included in the subset of tokens as dependent tokens; and
        storing one or more index numbers for each dependent token;
    building a semantic frame for each selected token, said semantic frame comprising;
        the index number of the selected token;
        the semantic role classifier assigned to the selected token;
        the correlation value of the selected token and an associated semantic role classifier; and
        the one or more index numbers of the one or more dependent tokens within the plurality of tokens.

11. An apparatus for semantic frame building, the apparatus further comprising:

an entity Interactive Voice Response (IVR) system, said entity IVR linked to a natural language process (NLP) pipeline, said entity IVR operable to receive an utterance from a network node via the NLP pipeline, the IVR comprising;
- a data featurizer, said data featurizer configured to:
  - tokenize the utterance into a plurality of tokens;
  - index the plurality of tokens by assigning an index number to each token included in the plurality of tokens based on a position of each token within the utterance; and
  - extract metadata for each token included in the plurality of tokens;
- a semantic role classifier, said semantic role classifier operable to:
  - select one for more tokens from the plurality of tokens for semantic role classification;
  - for each of the one or more selected tokens, identify a correlation value between a semantic role classifier selected from a plurality of semantic role classifiers and a selected token;
  - assign a semantic role classifier to each of the one or more selected tokens based on determination of the semantic role classifier correlating, above a predetermined correlation level, to the one or more selected tokens; and
  - for each of the one or more selected tokens, determine whether there is a dependency relation with any of the other one or more tokens included in the plurality of tokens, said tokens that are determined to have a dependency relation being identified as dependent tokens; and
  - store index numbers of the one or more dependent tokens;
- a semantic frame builder said semantic frame builder configured to build a semantic frame for each token, said semantic frame comprising:
  - the index number of the selected token;
  - the semantic role classifier assigned to the selected token;
  - the correlation value of the selected token and an associated semantic role classifier; and
  - the index numbers of the one or more dependent tokens within the plurality of tokens.

12. The apparatus of claim 11, the apparatus further comprising a machine learning algorithm, said machine learning algorithm operable to execute the data featurizer, semantic role classifier and semantic frame builder, said machine learning algorithm residing on a hardware processor and operating in tandem with hardware memory.

13. The apparatus of claim 12, wherein the machine learning algorithm is further configured to predict for a first utterance, based on a plurality of intents and a plurality of semantic frames generated for the first utterance, a response to the first utterance.

14. The apparatus of claim 11, further configured to build semantic frames for a plurality of utterances, said plurality of utterances occurring in a conversation.

15. The apparatus of claim 14, the apparatus further configured to generate a summary of the conversation using the semantic frames using the identified dependent tokens to reduce redundant and non-advantageous tokens from the conversation.

16. The apparatus of claim 15, the apparatus further configured to assign a highest significance score to a most recent utterance.

17. The apparatus of claim 11, wherein a semantic frame, for each token, provides a plurality of layers to the utterance.

18. The apparatus of claim 11, further configured to use a dependency parser to identify a dependency between a selected token and another token included in the plurality of tokens.

19. The apparatus of claim 18, the dependency parser further configured to identify dependencies and relationships between tokens, said dependency parser configured to:
- analyze a plurality of tokens included in an utterance;
- identify parts of speech of one or more tokens included in the plurality of tokens; and
- based on the identified parts of speech, extract a set of relationships and dependencies between the one or more tokens included in the plurality of tokens.

20. The apparatus of claim 11, wherein the semantic frame builder uses a Java®-based model.

* * * * *